United States Patent
Haruna et al.

(10) Patent No.: US 10,062,925 B2
(45) Date of Patent: Aug. 28, 2018

(54) ELECTROLYTE SOLUTION FOR LITHIUM SECONDARY BATTERY AND LITHIUM SECONDARY BATTERY

(71) Applicant: Hitachi, Ltd., Tokyo (JP)

(72) Inventors: Hiroshi Haruna, Tokyo (JP); Shin Takahashi, Tokyo (JP); Kazushige Kohno, Tokyo (JP); Yasutaka Tanaka, Hamamatsu (JP)

(73) Assignee: HITACHI, LTD., Tokyo (JP)

( * ) Notice: Subject to any disclaimer, the term of this patent is extended or adjusted under 35 U.S.C. 154(b) by 119 days.

(21) Appl. No.: 14/457,884

(22) Filed: Aug. 12, 2014

(65) Prior Publication Data
US 2015/0056502 A1 Feb. 26, 2015

(30) Foreign Application Priority Data
Aug. 22, 2013 (JP) ................. 2013-172364

(51) Int. Cl.
*H01M 10/0567* (2010.01)
*H01M 10/052* (2010.01)
*H01M 10/0525* (2010.01)
*H01M 10/0568* (2010.01)

(52) U.S. Cl.
CPC ..... *H01M 10/0567* (2013.01); *H01M 10/052* (2013.01); *H01M 10/0525* (2013.01); *H01M 10/0568* (2013.01); *H01M 2300/0025* (2013.01); *H01M 2300/0037* (2013.01); *Y02T 10/7011* (2013.01)

(58) Field of Classification Search
None
See application file for complete search history.

(56) References Cited

U.S. PATENT DOCUMENTS

| 5,891,592 A | 4/1999 | Mao et al. | |
| 6,828,066 B2 * | 12/2004 | Fujinami | H01M 10/0567 429/231.1 |
| 2003/0073006 A1 | 4/2003 | Fujinami et al. | |

(Continued)

FOREIGN PATENT DOCUMENTS

| JP | 2003-303617 A | 10/2003 |
| JP | 2010-251313 A | 11/2010 |
| JP | 2012-156087 A | 8/2012 |

(Continued)

OTHER PUBLICATIONS

Petibon et al., Study of Electrolyte Additives using electrochemical impedance spectroscopy on symmetric cells. Journal of Electrochemical Society, 160 (1) A117-A124 (2013).*

(Continued)

*Primary Examiner* — Alix E Eggerding
(74) *Attorney, Agent, or Firm* — Foley & Lardner LLP

(57) ABSTRACT

Disclosed is an electrolyte solution used for a lithium secondary battery having high capacity, less undergoing aging deterioration of capacity, and also excellent in life characteristic. The electrolyte solution used for a lithium secondary battery contains a compound having a trivalent or higher boron formed by incorporation of a boroxine compound represented by $(RO)_3(BO)_3$ in which R(s) each represent independently an organic group of 1 to 6 carbon atoms and $LiPF_6$, and a non-aqueous solvent.

2 Claims, 2 Drawing Sheets

(56) References Cited

U.S. PATENT DOCUMENTS

2007/0077496 A1* 4/2007 Scott .................... H01M 4/587
429/326
2010/0279155 A1 11/2010 Scott et al.

FOREIGN PATENT DOCUMENTS

KR 10-2008-0062671 A 7/2008
WO WO 2012/133556 A1 10/2012

OTHER PUBLICATIONS

Tanaka et al., Electrochemical Stability of a Carbonate Ester Electrolyte Containing Alkoxyboroxine. Abstract #386, $220^{th}$ ECS Meeting, © 2011 The Electrochemical Society.*
Tanaka et al. "Electrochemical Stability of an Electrolyte of LiPF6 in Carbonate Ester Containing Trialkoxyboroxine with LiNi0.5Mn1.5O4 Cathode." The Electrochemical Society, 2012.*
Horino, E., et al.; High Voltage Stability of Interfacial Reaction at the $LiMn_2O_4$ Thin-Film Electrodes/Liquid Electrolytes with Boroxine Compounds; Apr. 21, 2010; Journal of the Electrochemical Society; 157(6) (2010); pp. A677-A681.
European Patent Office extended search report on application 14181466.5 dated Jan. 7, 2015; 8 pages.
Scrosati, Bruno, et al.; 4.3 Novel Additives for Cathode Surface Passivation; exceprt from Lithium Batteries: Advanced Technologies and Applications; ESS. Jun. 18, 2013; pp. 84-86.

\* cited by examiner

ELECTROLYTE SOLUTION FOR LITHIUM SECONDARY BATTERY AND LITHIUM SECONDARY BATTERY

BACKGROUND

The present invention concerns an electrolyte solution used for a lithium secondary battery and the lithium secondary battery.

For power sources for use in mobile communication such as cellular phones or portable personal computers in recent years, reduction of size and increase of energy density (capacity) have been demanded more and more, and practical use of them in electric cars, hybrid cars utilizing electric power as a portion of driving power has been under progress. Further, with a view point of environmental protection, development has been progressed not only for the storage of midnight power but also for power source used for power storage in combination with solar cells and wind power generation. Under such a situation, while lithium secondary batteries have attracted attention, since the lithium secondary batteries are deteriorated in the charge/discharge efficiency by repeating charge/discharge, lithium secondary batteries with less aging deterioration of the battery performance have been demanded.

For example, Japanese Unexamined Patent Application Publication No. 2012-156087 discloses a non-aqueous electrolyte secondary battery having a negative electrode, a positive electrode, a separator, and a non-aqueous electrolyte in which the negative electrode contains an active material where deintercalation and intercalation of lithium ions proceed at 0.3 V or higher (vs. Li+/Li) and 2.0 V or lower (vs. Li+/Li), and an organic boron compound is contained in the non-aqueous electrolyte. Further, Japanese Unexamined Patent Application Publication No. 2010-251313 describes that the cyclic characteristic of a battery is improved by using a non-aqueous electrolyte containing at least one of carbodiimides, sulfate esters, and boron compound. Further, International Patent Publication No. WO2012/133556 discloses a lithium secondary battery using an electrolyte solution comprising a mixture of at least one solvent selected from carbonate esters and borate esters, $LiBF_4$, and tri-iso-propoxy boroxine.

Japanese Unexamined Patent Application Publication No. 2012-156087 involves a possibility that an electric amount that can be taken out, that is, the battery capacity may be deteriorated by lowering of an electrode potential difference between the positive and negative electrodes to decrease the battery voltage, and decreasing the working range of the positive and negative electrodes. In Japanese Unexamined Patent Application Publication No. 2010-251313, when a carbodiimide is incorporated in the electrolyte solution, since charges are consumed for the decomposition of the carbodiimide, the initial capacity of the battery may possibly be reduced. Further, in the lithium secondary battery of International Patent Publication WO2012/133556, while charging is possible even at a high voltage by incorporation of tri-iso-propoxy boroxine, a battery having more increased initial capacity and improved cycle characteristic is demanded. Accordingly, increase of capacitance and suppression of aging deterioration of the battery were not sufficient according to the prior art.

SUMMARY

In view of the situations described above, the present invention intends to provide a lithium secondary batter having high capacity, with less aging deterioration of the capacity and also excellent in life characteristics, as well as an electrolyte solution used therefor.

As a result of earnest studies, the present inventors have found that the subject can be solved by incorporating a predetermined boroxine compound and $LiPF_6$ thereby forming a compound having trivalent or higher boron in one molecule in an electrolyte solution.

That is, an electrolyte solution used for a lithium secondary battery according to the invention comprises a compound having trivalent or higher boron formed by incorporating a boroxine compound represented by $(RO)_3(BO)_3$ in which R(s) each independently represent an organic group of 1 to 6 carbon atoms and $LiPF_6$, and a non-aqueous solvent.

According to the invention, the initial capacity of the lithium secondary battery is increased and, further, aging deterioration of the battery capacity is suppressed to improve the life characteristics of the battery. Other subjects, constitutions, and advantageous effects than those described above will become apparent by the following description of preferred embodiments.

DETAILED DESCRIPTION

A preferred embodiment of the invention is to be described with reference to the drawings. The following description show specific examples for the content of the invention but the invention is not restricted by such description and various changes and modifications can be made by a person skilled in the art within the range of the technical idea disclosed in the present specification.

<Battery Structure>

Figure 1:
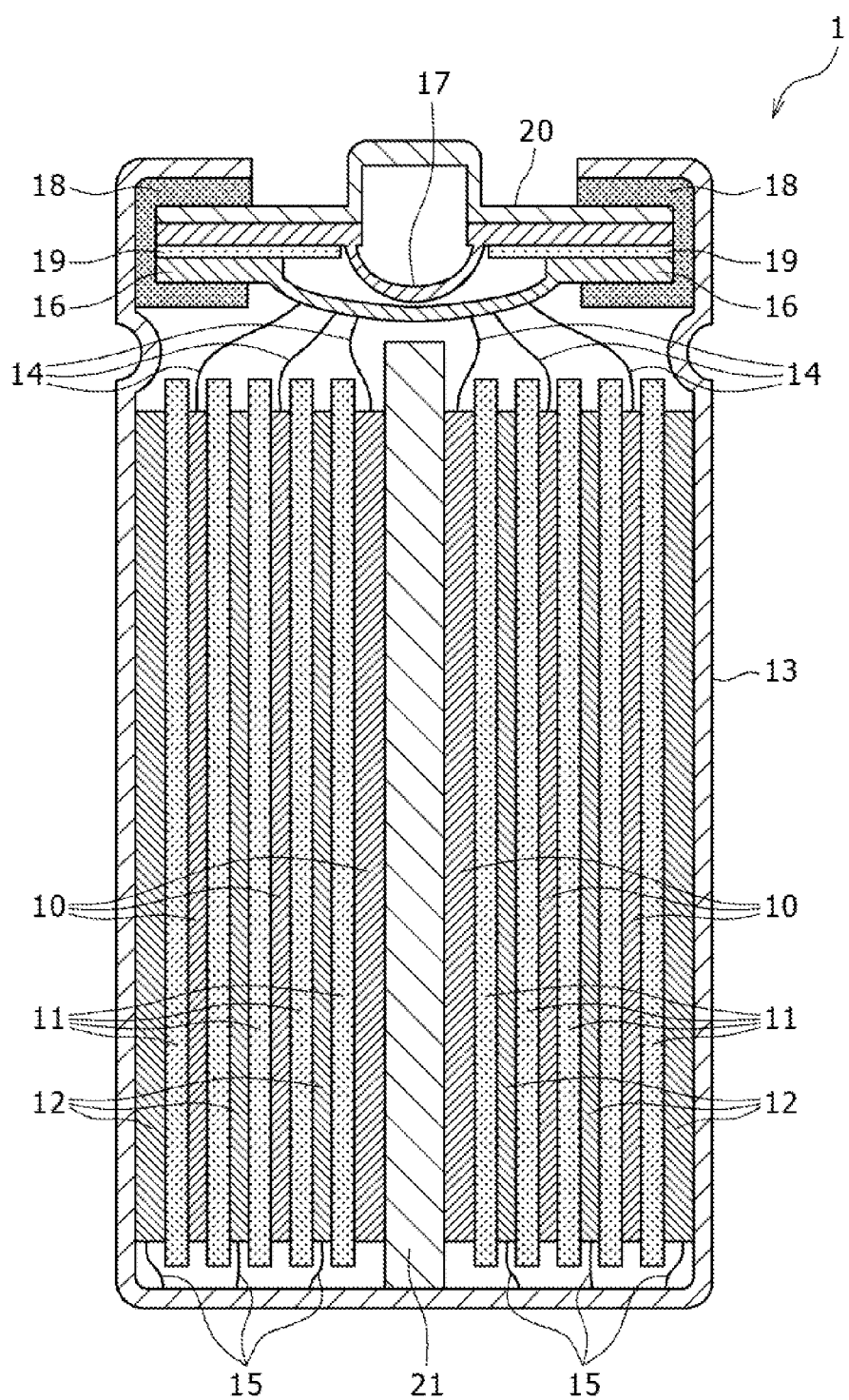
FIG. 1 is a view schematically illustrating an internal structure of a lithium secondary battery according to a preferred embodiment of the invention.

FIG. 1 is a view schematically illustrating an inner structure of a lithium secondary battery according to an embodiment of the invention. A lithium secondary battery 1 according to the embodiment of the invention illustrated in FIG. 1 mainly has a positive electrode 10, a separator 11, a negative electrode 12, a battery container 13, a positive electrode collector tab 14, a negative electrode collector tabs 15, an inner lid 16, an inner pressure release valve 17, a gasket 18, a positive temperature coefficient (PTC) resistor element 19, a battery lid 20, and an axial core 21. The battery lid 20 is an integrated part comprising the inner lid 16, the inner pressure release valve 17, the gasket 18, and the positive temperature coefficient resistor element 19. Further, the positive electrodes 10, the separator 11, and the negative electrode 12 are wound around the axial core 21.

In an electrode group formed by inserting the separator 11 between the positive electrode 10 and the negative electrode 12 and winding them around the axial core 21, any known axial core can be used as the axial core 21 so long as the axial core can support the positive electrode 10, the separator 11, and the negative electrode 12. In this embodiment, the electrode group is formed as a cylindrical shape. The shape of the battery container 13 is formed as a cylindrical shape conforming to the shape of the electrode group.

The material of the battery container 13 is selected from materials having corrosion resistance to the electrolyte solution, for example, aluminum, stainless steel, nickel plated steel, etc. The material for the battery container 13 is selected such that corrosion of the battery container 13 and denaturation of material due to alloying with lithium ions do not occur to a portion in contact with the electrolyte solution when the battery container 13 is electrically connected with the positive electrode 10 or the negative electrode 12.

The electrode group is housed in the battery container 13, the negative electrode collector tab 15 is connected to the inner wall of the battery container 13, and the positive electrode collector tab 14 is connected to the bottom of the battery lid 20. The electrolyte solution is injected into the inside of the electric container 13 before sealing the battery. The method of injecting the electrolyte solution includes a method of directly adding the electrolyte solution to the electrode group in a state of opening the battery lid 20, or a method of adding the electrolyte solution from an injection port provided to the battery lid 20.

Then, the battery lid 20 is tightly fixed to the battery container 13 to seal the entire battery. When an injection port of the electrolyte is present, this is also sealed. The battery can be sealed by using a known technique such as welding or caulking.

<Negative Electrode>

The negative electrode 12 mainly comprises a negative electrode active material, a binder, and a collector and can be manufactured by mixing the negative electrode active material with the binder such as a styrene butadiene polymer and, optionally, with carboxymethyl cellulose or the like to prepare a negative electrode mix slurry, and coating the slurry on a collector, for example, by a doctor blade method, a dipping method, or a spray method, and then pressing the same. Further, by coating and drying the negative electrode mix slurry by a plurality of times, a plurality of mix layers can be stacked over the collector.

As the negative electrode active material, easily graphitizable material obtained from natural graphite, petroleum coke, or coal pitch coke treated at a high temperature of 2,500° C. or higher, mesophase carbon, amorphous carbon, graphite coated at the surface with amorphous carbon, carbon materials with the surface crystallinity being lowered by mechanically treating the surface of natural or artificial graphite, materials formed by coating and adsorbing organic materials such as polymers on carbon surface, carbon fibers, metal lithium, metals alloyed with lithium, materials comprising a metal supported on the surface of carbon particles can be used. The metal to be supported includes, for example, a metal selected from lithium, aluminum, tin, silicon, indium, gallium, and magnesium or alloys thereof. Further, oxides of metals such as tin, silicon, iron, and titanium may also be used as the negative electrode active material. Such negative electrode active materials may be used each alone or two or more of them may be used in admixture.

The particle diameter of the negative electrode active material is usually defined such that it is at or less than the thickness of a mix layer formed from the negative electrode active material and the binder. If coarse particles having a size more than the thickness of the mix layer are present in the powder of the negative electrode active material, it is preferred to previously remove coarse particles by separation with a sieve, wind stream separation, etc. to prepare particles having a size at or less than the thickness of the mix layer.

For the collector of the negative electrode 12, a copper foil, etc. can be used. For example, a copper foil, etc. of about 7 μm to 25 μm thickness is used preferably.

When the negative electrode mix layer is coated on both surfaces of the collector, the thickness of the mix layer on each surface is preferably 50 μm to 200 μm but this is not limitative.

As the binder, polymers which are dissolved, swollen or dispersed in water can be used. For example, styrene-butadiene rubber copolymers, polymers having acrylic groups, polymers having cyano groups, etc. are applicable. The amount of the binder in the negative electrode mix layer is preferably about 0.8% by weight to 1.5% by weight based on the total amount of the negative electrode active material, the carboxymethyl cellulose, etc. which is used with a purpose of improving the viscosity improving effect, and the binder. If the amount of the binder ingredient is excessively large, this increases the internal resistance value and lowers the battery capacity. On the other hand, if the amount of the binder ingredient is insufficient, adhesion strength of the electrode is lowered to possibly cause difficulty in the battery manufacture and deteriorate the battery storage characteristic and cycle characteristic. Since the organic material per se such as the carboxymethyl cellulose that is added with an aim of improving the viscosity increasing effect of the mix slurry may sometimes develops an effect of improving the bonding force and, further, the optimal value thereof may vary greatly depending on the active material to be used, the blending ratio is preferably determined on the basis of the result of a test for initial characteristic, storage characteristic, cycle characteristic, etc. of the battery.

Further, an organic binder not dissolved, swollen, or dispersed in water can also be used. When the organic binder is used, it can be used in an amount, for example, about 3% by weight to 6% by weight based on the total amount of the negative electrode active material, carboxymethyl cellulose, and the binder. The optimal blending ratio is preferably determined based on the result of test for storage characteristic, cycle characteristic, etc. of the battery in the same manner as in the case of the aqueous binder.

<Electrolyte Solution>

The electrolyte solution in the invention contains a compound having trivalent or higher boron formed by incorporating a boroxine compound and $LiPF_6$, and a non-aqueous solvent. This can improve the ionization degree of lithium.

The boroxine compound for forming the compound having trivalent or higher boron in the electrolyte solution is represented by $(RO)_3(BO)_3$. R(s) each represent independently an organic group of 1 to 6 carbon atoms, and specifically includes linear or branched alkyl groups, cycloalkyl groups, etc. of 1 to 6 carbon atoms. Further, the organic group may sometimes contain halogen, nitrogen, sulfur, etc.

Specific examples of the boroxine compound includes, for example, $(O-CH_3)_3(BO)_3$, $(O-CH_2CH_3)_3(BO)_3$, $(O-CH(CH_3)_2)_3(BO)_3$, $(O-C_6H_{11})_3(BO)_3$, etc.

The boroxine compound can be synthesized, for example, by condensation reaction (dehydration reaction) of $B(OR)_3$ and boric anhydride $B_2O_3$. Boroxine compounds in which various organic groups are bonded as R can be synthesized by selecting the kinds of $B(OR)_3$. Further, $(R_1O)(R_2O)(R_3O)(BO)_3$ ($R_1$ to $R_3$ represent each an organic group different from each other), etc. having different organic groups in one molecule can be obtained by reacting compounds having an OH group in addition to $B(OR)_3$ and changing the mol number of them.

The electrolyte solution contains $LiPF_6$ as an electrolyte and a compound having trivalent or higher compound, for example, tetravalent boron in one molecule is formed by reaction between a boron compound of $(RO)_3(BO)_3$ and $LiPF_6$. Boron charged negatively and $Li^+$ interact to each other in which the amount of ions capable of contributing to battery reaction is increased to attain high capacity of the battery.

The reaction mechanism considered to provide the effect described above is as follows. In the boroxine compound represented by $(RO)_3(BO)_3$, since boron atoms are bonded to three oxygen atoms, the density of electron, on the boron atom is high. In the electrolyte solution, while the electrolyte $Li^+$ interacts with the electrolyte anion $PF_6^-$, $(RO)_3(BO)_3$ and $Li^+$ form a coordinate bond by electrostatic interaction due to high density of electrons on boron of $(RO)_3(BO)_3$. As a result, it is considered that the ionization degree of $Li^+$ is increased and boron of $(RO)_3(BO)_3$ takes a trivalent or higher state.

Change of boron valence can be judged based on the chemical shift that reflects the charge density on boron by $^{11}B$ NMR measurement, etc.

Figure 2:
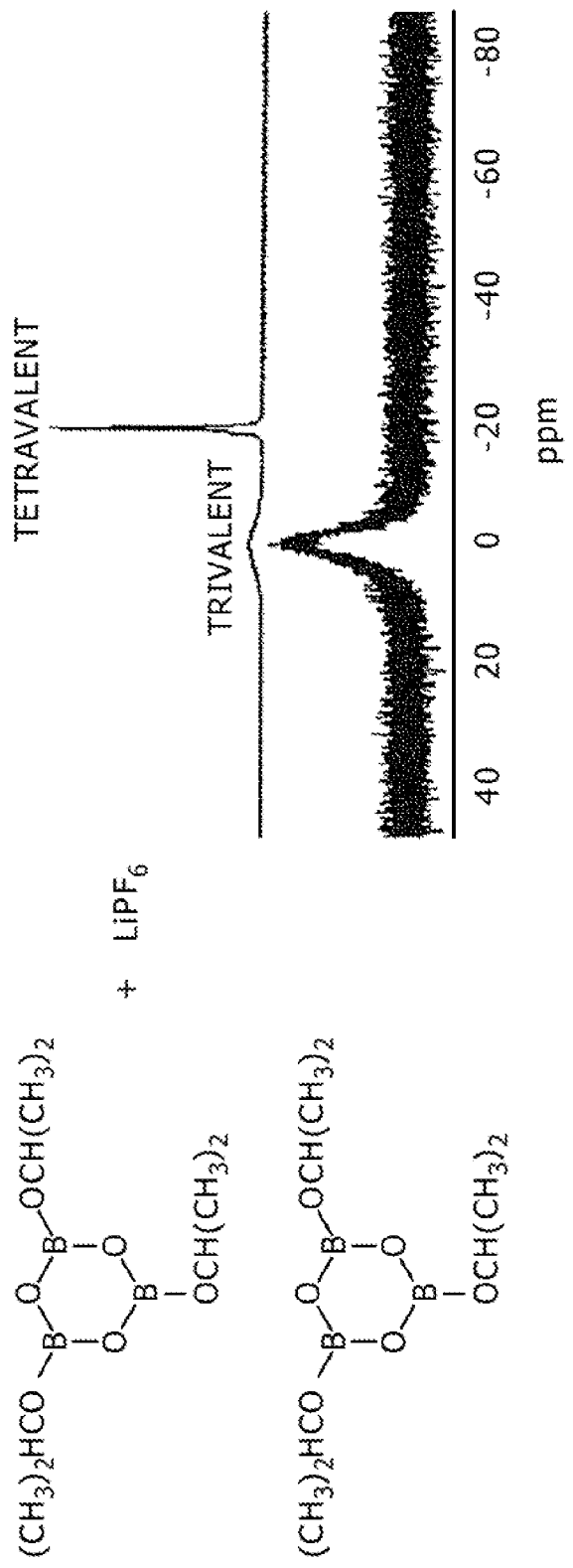
FIG. 2 is a chart showing the result of $^{11}B$ NMR measurement for a single system of a $(O-CH(CH_3)_2)_3(BO)_3$, as well as a mixed system of $(O-CH(CH_3)_2)_3(BO)_3$ and $LiPF_6$.

For example, FIG. 2 illustrates the result of NMR spectroscopy for $(O-CH(CH_3)_2)_3(BO)_3$ in which R in $(RO)_3(BO)_3$ is $O-CH(CH_3)_2$ in a case of a single system of $(O-CH(CH_3)_2)_3(BO)_3$ (lower column) and in a case of a mixed system of $(O-CH(CH_3)_2)_3(BO)_3$ and $LiPF_6$ (upper column). In the single system of $(O-CH(CH_3)_2)_3(BO)_3$, $(O-CH(CH_3)_2)_3(BO)_3$ is dissolved into a solution mixture of ethylene carbonate (EC) and ethyl methyl carbonate (EMC) (EC:EMC=1:3 (volumic ratio)) as a non-aqueous solvent at a molar mass concentration of 1.0 mol/kg. In the mixed system of $(O-CH(CH_3)_2)_3(BO)_3$ and $LiPF_6$, $(O-CH(CH_3)_2)_3(BO)_3$, and $LiPF_6$ are dissolved into a solution mixture of ethylene carbonate (EC) and ethyl methyl carbonate (EMC) as a non-aqueous solvent each at a mass molar concentration of 1.0 mol/kg. Only one ingredient is observed for the former system whereas, in the latter system, an ingredient shifted by about 20 ppm to the side of a higher magnetic field is also observed in addition to the signal observed in the former.

Further, when the chemical shifts of boron signals are compared with a boric acid of known valence (trivalence) being as an external standard, a chemical shift is observed at a position substantially equal to the case of boric acid in the single system of $(O-CH(CH_3)_2)_3(BO)_3$ whereas two types of chemical shifts are observed at a position substantially identical with that for boric acid and at a position shifted by about 20 ppm to the side of the higher magnetic field in the mixed system of $(O-CH(CH_3)_2)_3(BO)_3$ and $LiPF_6$. Thus, it can be continued that a trivalent ingredient and an ingredient of a higher valence are present together as boron. For confirming such structural change more in details, 2-dimensional NMR, $^1H$ NMR, etc. can also be used together.

It is confirmed by $^{11}B$ NMR and $^1H$ NMR that the phenomenon described above does not occur in a case of using $LiBF_4$ as an electrolyte. That is, it has been found that the interaction between boron of $(RO)_3(BO)_3$ and the electrolyte changes depending on the type of the counter anion of the electrolyte. Since this is a thermodynamic effect, the effect can be confirmed distinctly by measurement under low temperature or high temperature circumstances.

The amount of the boroxine compound is preferably within a range of 0.1% by weight to 1.0% by weight and, more preferably, 0.3% by weight to 0.8% by weight based on the total amount of $LiPF_6$ and the non-aqueous solvent.

Further, vinylene carbonate can be incorporated in addition to the boroxine compound. This can suppress the decomposing reaction of the electrolyte solution at the surface of the negative electrode to improve the cycle characteristic of a cell.

The concentration of the vinylene carbonate in the electrolyte solution is preferably 2% by weight or less.

Surface functional groups such as C=O, C—H, and COO are present at the surface of the negative electrode active material and such surface functional groups take place irreversible reaction with an electrolyte solution in the cell reaction to form a surface coating film which is called as a SEI membrane. Since the formation of the SEI membrane consumes electric charges due to the formation thereof, this causes deterioration of the battery capacity. However, since the vinylene carbonate, when participating in the reaction, suppresses deterioration of the capacity and the SEI membrane suppresses reaction with the electrolyte solution at the electrode interface with lapse of time, a lithium secondary battery having an improved life can be provided.

The non-aqueous solvent includes, for example, ethylene carbonate, propylene carbonate, γ-butyrolactone, dimethyl carbonate, ethyl methyl carbonate, diethyl carbonate, etc. For the non-aqueous solvents, halides such as fluoro substituents or those substituted with sulfur elements may also be used. Further, such non-aqueous solvents may be used alone or in admixture of two or more of them. When two or more of non-aqueous solvents are used, a mixed solvent system comprising a solvent having a high viscosity such as a cyclic carbonate or a cyclic lactone and a solvent having a low viscosity such as a chained carbonate or a chained ester is used preferably.

As the electrolyte, at least $LiPF_6$ is used. In addition to $LiPF_6$, lithium salts such as $LiBF_4$, $LiClO_4$, $LiAsF_6$, $LiCF_3SO_2$, $Li(CF_3SO_2)_2N$, $Li(C_2F_5SO_2)N$, etc. may be used in admixture. The ingredients other than $LiPF_6$ are preferably less than 30% by weight in the electrolyte.

The concentration of the electrolyte is preferably 0.6 mol/L to 1.5 mol/L based on the non-aqueous solvent but the concentration is not limitative.

Various kinds of additives can also be mixed optionally to the electrolyte solution as ingredients other than the boroxine compound, the electrolyte, the vinylene carbonate, and the non-aqueous solvent. The additives include, for example, additives forming a membrane on the surface of the positive electrode and/or negative electrode active material to suppress the reducing decomposition on the surface of the electrode such as compounds having carboxylic anhydride group, compounds having sulfur elements such as 1,3-propane sultone, and compounds having boron, additives for suppressing overcharge such as biphenyl and cyclohexyl benzene, additives for providing the electrolyte solution with non-combustibility or non-flammability by phosphoric acid type or halogen substitution, additives for suppressing leaching of Mn from the positive electrode active material, additives for improving the ionic conductivity of the electrolyte solution, self-extinguishing additives, and additives for improving wettability of the electrodes and the separator. They can be added to the electrolyte solution depending on respective purposes. Further, two or more kinds of the additives may be mixed. The concentration of the additives in total is preferably less than 10% by weight in the electrolyte solution.

<Separator>

The separator 11 is used for preventing short-circuit caused by direct contact between the positive electrode 10 and the negative electrode 12. As the separator 11, a finely porous polymeric film comprising polyethylene, polypropylene, aramid resin, etc. or a film formed by coating the surface of the polymeric film with a heat resistant material such as alumina particles can be used.

<Positive Electrode>

The positive electrode mainly comprises a positive electrode active material, a conduction agent, a binder, and a collector. Specifically, the positive electrode can be manufactured by mixing the positive electrode active material with a binder, a conduction agent and, optionally, the carboxymethyl cellulose, etc. to prepare a positive electrode mix, coating the mix to the collector, for example, by a doctor blade method, a dipping method, or a spray method, then drying the organic solvent, and applying press forming by using a roll press. Further, a plurality of mix layers can be laminated to a collector by applying the process from coating to drying by a plurality of times.

The positive electrode active material includes, for example, $LiCoO_2$, $LiNiO_2$, and $LiMn_2O_4$. In addition, the positive electrode active material usable herein includes, for example, $LiMnO_3$, $LiMn_2O_3$, $LiMnO_2$, $Li_4Mn_5O_{12}$, $LiMn_{2-x}M_xO_2$ (in which M is at least one member selected from the group consisting of Co, Ni, Fe, Cr, Zn, and Ti and x is 0.01 to 0.2), $Li_2Mn_3MO_8$ (in which M is at least one member selected from the group consisting of Fe, Co, Ni, Cu, and Zn), $Li_{1-x}A_xMn_2O_4$ (in which A is at least one member selected from the group consisting of Mg, B, Al, Fe, Co, Ni, Cr, Zn, and Ca, and x is 0.01 to 0.1), $LiNi_{1-x}M_xO_2$ (in which M is at least one member selected from the group consisting of Co, Fe, and Ga, and x is 0.01 to 0.2), $LiFeO_2$, $Fe_2(SO_4)_3$, $LiCo_{1-x}M_xO_2$ (in which M is at least one member selected from the group consisting of Ni, Fe, and Mn, and x is 0.01 to 0.2), $LiNi_{1-x}M_xO_2$ (in which M is at least one member selected from the group consisting of Mn, Fe, Co, Al, Ga, Ca, and Mg, and x is 0.01 to 0.2), $Fe(MoO_4)_3$, $FeF_3$, $LiFePO_4$, and $LiMnPO_4$.

The particle diameter of the positive electrode active material is usually defined such that it is at or less than the thickness of a mix layer formed from the positive electrode active material and the binder. If coarse particles having a size more than the thickness of the mix layer are present in the powder of the positive electrode active material, it is preferred to previously remove the coarse particles by separation with a sieve, wind stream separation, etc. to prepare particles having a size at or less than the thickness of the mix layer.

Further, since the positive electrode active substance is an oxide type compound and generally has high electric resistance, a conduction agent comprising a carbon powder, etc. is used for compensating electric conductivity. Since both of the positive electrode active material and the conduction agent are usually powders, powders can be bonded each other by mixing a binder to the powders and can be adhered to the collector.

As the collector of the positive electrode 10, an aluminum foil of 10 μm to 100 μm thickness, a punctured aluminum foil of 10 μm to 100 μm thickness with a pore diameter of 0.1 mm to 10 mm, an expanded metal or foamed metal plate, etc. are used. In addition to aluminum, materials such as stainless steel and titanium can also be used. Optional collectors can be used with no particular restriction in view of material, shape, manufacturing method, etc.

When the positive electrode mix layer is coated on both surfaces of the collector, the thickness of the mix layer on each surface is preferably 50 μm to 200 μm, but not restricted to such thickness.

As the binder used for the positive electrode, polyvinylidene difluoride (PVDF), acryl polymers, polymers having imide groups or amide groups, etc. can be used. Further, the binder in the positive electrode mix layer may increase the internal resistance value and deteriorate the battery capacity if the binder is used in excess amount. On the other hand, if the amount of the binder ingredient used is insufficient, the adhesion strength of the electrode may possibly be lowered to invite difficulty in the manufacture of the electrode or deteriorate the storage characteristic and the cycle characteristic of the battery. Accordingly, the amount of the binder is properly determined while considering the balance among them. Specifically, the amount of the binder is preferably 1% by weight to 7% by weight based on the total amount of the positive electrode active material, the conductivity agent, and the binder. The optimal blending ratio is determined desirably based on the result of a test for storage characteristic and cycle characteristic of the battery.

In the embodiment described above, while the electrode group was formed as a cylindrical shape, various shapes may also be adopted, for example, laminated rectangular electrodes, the positive electrode 10 and the negative electrode 12 wound into an optional shape such as a flat shape. The shape of the battery container 13 may be, for example, a flat oval shape, a flat elliptic shape, or a square shape in addition to the cylindrical shape described above. Further, the axial core 21 may be omitted depending on the shape of the battery or with an aim of improving the volumic occupancy ratio of the electrode in the inside of the battery.

EXAMPLES

The present invention is to be described more in details with reference to examples and comparative examples, but the present invention is not restricted to them.

Example 1

Negative Electrode

Natural graphite having a spacing of 0.368 nm obtained by X-ray diffractometry, an average particle diameter of 20 and a specific surface area of 5 $m^2/g$ was used as the negative electrode active material. An aqueous liquid dispersion containing natural graphite, water swollen carboxymethyl cellulose, and a styrene-butadiene copolymer was sufficiently kneaded by using a mixer having a stirring device such as a rotary blade, to prepare a negative mix slurry. The mixing ratio of the negative electrode active material, carboxymethyl cellulose, and the styrene-butadiene copolymer was 97:1.5:1.5 by weight ratio.

The native electrode mix slurry was coated substantially uniformly on both surfaces of the rolled copper foil of 10 μm thickness (collector). After drying, it was subjected to compression molding such that the density of the active material of the negative electrode was about 1.5 $g/cm^2$ by a roll press to manufacture a negative electrode. After applying pressing for density control, the negative electrode was cut so as to have a 55 cm coating length of the mix layer and a 5 cm not-coated area, that is, 60 cm in total length and a coating width of 5.6 cm. Then, an Ni lead was welded to the not-coated area to manufacture a negative electrode provided with a current lead out portion.

<Positive Electrode>

For the positive electrode active material, $Li_{1.02}Mn_{1.98}Al_{0.02}O_4$ having an average particle diameter of 10 μm and a specific surface area of 1.5 $m^2/g$ was used. A positive electrode mix slurry and a conduction agent comprising lumpy graphite and acetylene black mixed at 9:2 ratio were dispersed in a N-methylpyrrolidone (NMP) solution containing PVDF previously adjusted to 5 wt % as a binder, to prepare a positive electrode mix slurry. In the preparation of the slurry, the materials were sufficiently kneaded by using a mixer provided with a stirring device such as a rotary blade in the same manner as in the case of the negative electrode. The mixing ratio of the positive electrode active material, the conduction agent, and PVDF was 85:10:5 by weight ratio.

The positive electrode mix slurry was coated to both surfaces of an aluminum foil of 20 μm thickness (collector) uniformly and homogeneously as much as possible and dried in the same procedures as those in the negative electrode. Then, they were subjected to compression molding by a roll press such that the density of the active material of the positive electrode was 2.6 g/cm$^3$, to manufacture a positive electrode. Then, the positive electrode was cut so as to have a 50 cm coating length of the mix layer of the positive electrode and a 5 cm not coated area, that is, 55 cm length in total. Then, a lead of an aluminum foil for leading out current was welded to the non-coated area to manufacture a positive electrode provided with a current lead portion.

<Electrolyte Solution>

LiPF$_6$ was dissolved as an electrolyte at a concentration of 1 mol/L into a mixed solution of ethylene carbonate (EC) and ethyl methyl carbonate (EMC) (EC:EMC=1:2 (volume ratio)) and, further, vinylene carbonate was mixed at a concentration of 1.0% by weight based on the entire amount and, further, (O—CH(CH$_3$)$_2$)$_3$BO)$_3$ was dissolved at a concentration of 0.2% by weight based on the total amount of LiPF$_6$ and the non-aqueous solvent to prepare an electrolyte solution containing a compound having trivalent or higher boron.

A cylindrical lithium secondary battery as illustrated in FIG. 1 was manufactured by using the thus prepared positive electrode and negative electrode. Specifically, a positive electrode collector tab and a negative electrode collector tab for leading out current were supersonically welded to the positive electrode and the negative electrode. The positive electrode collector tab and the negative electrode collector tab were respectively made of a metal foil of a material identical with that of the rectangular collector. Further, a separator as a single polyethylene layer film was put and stacked between the positive electrode and the negative electrode, which were wound into a cylindrical shape (spiral shape) to form an electrode group, and housed in the battery container as illustrated in FIG. 1. After housing the electrode group in the battery container, an electrolyte solution was injected into the battery container, a sealing battery lid attached with the positive electrode collector tab was fixed closely by way of a gasket to the battery container, and sealed by caulking to manufacture a cylindrical lithium secondary battery of 18 mm in diameter and 650 mm in length.

The cylindrical lithium secondary battery manufactured as described above was put to constant-current/constant-voltage charge in a thermostatic bath at 25° C. at a charging current of 1500 mA and a voltage of 4.2 V for three hours. After an interval of five hours, constant-current discharge was performed at a discharging current of 1500 mA till the battery voltage was lowered to 3.0 V. Charge and discharge were performed for 3 cycles in total with the charge and discharge processes being as one cycle. A cycle load characteristic test was performed with a discharge capacity at the third cycle being as 100%. The cycle load characteristic test was repeated for 100 cycles, one cycle comprising constant-current and constant-voltage charge at a charging current of 1500 mA and a battery voltage of 4.2 V for 5 hours, leaving for 5 hour interval, and subsequent constant-current discharge at a discharging current of 1500 mA till lowering of the battery voltage was lowered to 3.0 V. After the test of 100 cycles, the ratio of the discharge capacity at a 100th cycle relative to the discharge capacity at the third cycle was determined. A higher ratio means that the cycle characteristic is more excellent.

Example 2

A cylindrical lithium secondary battery was manufactured and the cycle characteristic was investigated in the same manner as in Example 1 except for changing the amount of (O—CH(CH$_3$)$_2$)$_3$(BO)$_3$ added to the electrolyte solution to 0.5% by weight based on the total amount of LiPF$_6$ and the non-aqueous solvent.

Example 3

A cylindrical lithium secondary battery was manufactured and the cycle characteristic was investigated in the same manner as in Example 1 except for changing the amount of (O—CH(CH$_3$)$_2$)$_3$(BO)$_3$ added to the electrolyte solution to 1.0% by weight based on the total amount of LiPF$_6$ and the non-aqueous solvent.

Example 4

A cylindrical lithium secondary battery was manufactured and the cycle characteristic was investigated in the same manner as in Example 1 except for dissolving LiPF$_6$ as an electrolyte at a concentration of 1 mol/L in a mixed solution of ethylene carbonate (EC) and ethyl methyl carbonate (EMC) (EC:EMC=1:2 (volume ratio)) and adding (O—CH(CH$_3$)$_2$)$_3$(BO)$_3$ at a concentration of 0.2% by weight based on the total amount of LiPF$_6$ and a non-aqueous solvent to prepare an electrolyte solution.

Comparative Example 1

LiPF$_6$ as an electrolyte was dissolved at a concentration of 1 mol/L into a mixed solution of ethylene carbonate (EC) and ethyl methyl carbonate (EMC) (EC:EMC=1:2 (volume ratio)) to prepare an electrolyte solution. A cylindrical lithium secondary battery was manufactured and a cycle characteristic was investigated in the same manner as in Example 1 except for using the prepared electrolyte solution.

Comparative Example 2

An electrolyte solution was prepared by dissolving LiPF$_6$ as an electrolyte at a concentration of 1 mol/L in a mixed solution of ethylene carbonate (EC) and ethyl methyl carbonate (EMC) (EC:EMC=1:2 (volume ratio)) and further mixing vinylene carbonate at a concentration of 1.0% by weight based on the entire amount. A cylindrical lithium secondary battery was manufactured and the cycle characteristic was investigated in the same manner as in Example 1 except for using the electrolyte solution.

Result of measurement is shown in Table 1. Test results of the examples were compared with the case of not containing the vinylene carbonate and the boroxine compound described in Comparative Example 1 as a reference. In Comparative Example 1, the discharge capacity after 100 cycles was lowered to 81% of that at the third cycle. By incorporation of 0.2% by weight of the boroxine compound and 1.0% by weight of the vinylene carbonate as in Example 1, the discharge capacity after 100 cycles showed 88%, which was improved by 7 points compared with that of Comparative Example 1. Further, in the lithium secondary battery of Example 2 using the electrolyte solution in which 0.5% by weight of the boroxine compound and 1.0% by weight of the vinylene carbonate were dissolved, the discharge capacity after 100 cycles showed 93%, which was improved by 12 points compared with that of Comparative Example 1. Then, in the lithium secondary battery of Example 3 using the electrolyte solution containing 1.0% by weight of the boroxine compound and 1.0% by weight of the vinylene carbonate, the discharge capacity was improved by 10 points compared with that of Comparative Example 1.

Further, as illustrated in Example 4, also in the battery containing only 0.2% by weight of the boroxine compound and not containing the vinylene carbonate as additives to the electrolyte solution, the discharge capacity after 100 cycles was improved by 6 points compared with that of Comparative Example 1. Comparative Example 2 is an example of incorporating only the vinylene carbonate by 1.0% by weight as the additives to the electrolyte solution. Although the discharge capacity was improved by four points compared with that of Comparative Example 1, no sufficient improvement of the characteristic was observed since the boroxine compound was not contained. The effect of improving the characteristic was improved further by incorporation of the boroxine compound and the vinylene carbonate together and this is considered that the reducing decomposition of the electrolyte solution on the surface of the negative electrode was suppressed by the incorporation of the vinylene carbonate, the membrane forming reaction due to the vinylene carbonate proceeded at first to suppress the decomposition of the boroxine compound and change of the physical property of the electrolyte solution.

TABLE 1

Test result of cycle load characteristic test

| | Boroxine compound (wt %) | Vinylene carbonate (wt %) | After 100 cycles (%) |
|---|---|---|---|
| Example 1 | 0.2 | 1.0 | 88 |
| Example 2 | 0.5 | 1.0 | 93 |
| Example 3 | 1.0 | 1.0 | 91 |
| Example 4 | 0.2 | 0 | 87 |
| Comp. Example 1 | 0 | 0 | 81 |
| Comp. Example 2 | 0 | 1.0 | 85 |

As has been described above, the cycle characteristic of the battery can be improved remarkably by using the electrolyte solution containing a compound having trivalent or higher boron. According to the invention, it is possible to suppress aging deterioration and remarkably improve the life of the battery compared with the lithium secondary batteries using the conventional electrolyte solution.

The present invention is not restricted to the embodiment described above but can include various modified examples. For example, configurations can be added, deleted, or substituted for a portion of the configuration of the embodiment.

What is claimed is:

1. An electrolyte solution used for a lithium secondary battery containing a compound having trivalent and higher boron formed by incorporation of a boroxine compound represented by $(RO)_3(BO)_3$ in which R(s) each represent $CH(CH_3)_2$ and $LiPF_6$, and a non-aqueous solvent, wherein the amount of the boroxine compound is 0.1% by weight to 1.0% by weight based on the total amount of $LiPF_6$ and the non-aqueous solvent, and wherein the electrolyte solution for the lithium secondary battery further contains vinylene carbonate.

2. A lithium secondary battery having a positive electrode and a negative electrode capable of occluding and releasing lithium ions and a separator, and using the electrolyte solution used for the lithium secondary battery according to claim 1 as an electrolyte solution.

\* \* \* \* \*